SOLENOID SELECTION ARRANGEMENT

Filed April 12, 1963 3 Sheets-Sheet 1

INVENTOR.
Ronald E. Schauer
BY
C. A. Gulbrandsen
ATTY.

INVENTOR.
Ronald E. Schauer

BY
C A Gulbrandsen
ATTY.

Nov. 29, 1966 R. E. SCHAUER 3,289,191

SOLENOID SELECTION ARRANGEMENT

Filed April 12, 1963 3 Sheets-Sheet 3

INVENTOR.
Ronald E. Schauer

BY

O. A. Gulbrandsen
ATTY 3,289,191
SOLENOID SELECTION ARRANGEMENT
Ronald E. Schauer, Chicago, Ill., assignor to Automatic Electric Laboratories, Inc., Northlake, Ill., a corporation of Delaware
Filed Apr. 12, 1963, Ser. No. 272,607
1 Claim. (Cl. 340—176)

The invention relates to magnetic memory systems and in particular to arrangements for addressing and interrogating the memory of magnetic memory systems.

Generally, a magnetic memory employs bistable devices, such as ferrite cores or magnetic wires, for storage of information. The information is advantageously stored in and extrated from the memory in binary form. Various methods have been devised for reading and writing information. However, these methods rely on the use of solenoids for establishing magnetic fields to read and write information. These solenoids are energized by current in one direction for writing or storing information and in an opposite direction for reading the stored information, therefore opposite polarity current drivers are needed for each solenoid. As the size of a magnetic memory is increased, the number of required current drivers is increased. Switching systems, including selective or sequential order systems, have been designed to command the drivers to read or write and when to read or write. The present invention employs a novel switching and interconnection arrangement to minimize the number of required current drivers and switches.

It is therefore the object of this invention to provide a novel and improved arrangement for addressing and interrogating a magnetic memory.

A more particular object of the invention is to provide an arrangement for solenoid selection employing a minimum number of current drivers and switches.

Since an operative system may, for convenience, require that a false read or write order be given to the drivers in connection with other working parts of the system, it is another object of the invention to allow such a command to enable the corresponding drivers without energizing a solenoid.

According to the invention, solenoids are arranged in pairs; the individual solenoids having connected thereto a read current generator and a write current generator by way of oppositely poled diodes. Each generator has one solenoid from each pair connected thereto. A read or a write command from the system logic of course controls the selection and operation of the current generators, while a switch that is common to each solenoid pair selects the correct solenoid, again according to instruction from system logic. Current direction sensitive series circuits are established for read or write operation as will be explained below.

Other objects and features of the invention will become apparent and the invention will best be understood from the following description and the accompanying drawings.

In order to better understand this system operation, the following brief circuit descriptions are given.

Figure 2:
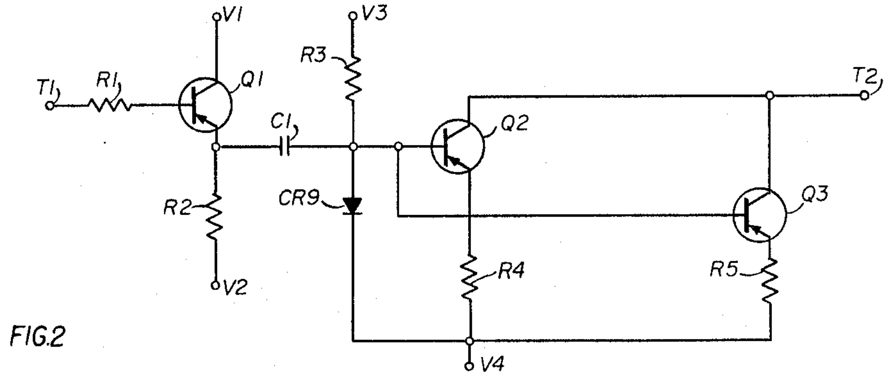
FIG. 2 is a circuit diagram of a constant current generator employed as a solenoid READ driver.

Referring to FIG. 2, the solenoid READ generator circuit is shown employing transistors Q2 and Q3 connected as parallel drivers. Transistor Q1, connected as an emitter-follower circuit, is capacitively coupled by capacitance C1 to transistors Q2 and Q3. Interposed between transistor Q1 and the input terminal T1 is input resistance R1. The emitter of transistor Q1 is connected through resistance R2 to potential V2 and its collector is connected to potential V1. Transistors Q2 and Q3 have their bases commonly connected to potential V3 through resistance R3; their emitters commonly connected to potential V4 by way of resistances R4 and R5, respectively; and their collectors commonly connected to the output terminal T2. Diode CR9 is connected between the common base connection of transistors Q2 and Q3 and the potential V4. A suitable input signal at the terminal T1 causes a voltage swing, say ten volts, to occur on the bases of transistors Q2 and Q3. The emitter resistors R4 and R5 determine the resulting READ current.

Figure 3:
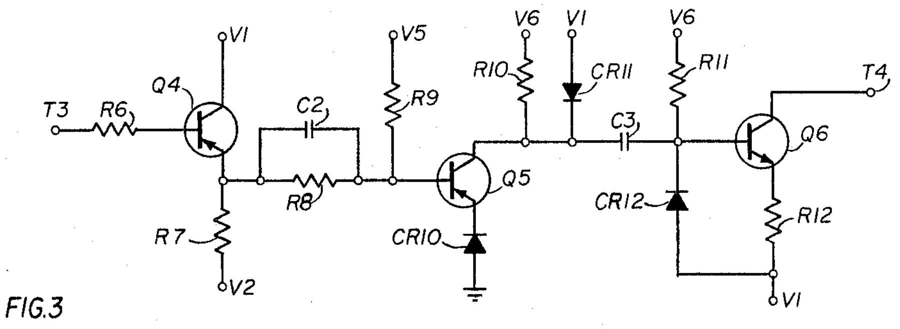
FIG. 3 is a circuit diagram of a constant current generator employed as a solenoid WRITE driver.

Referring to FIG. 3, the solenoid WRITE generator circuit, transistor Q4 is employed in an emitter-follower configuration. The base electrode of transistor Q4 is connected to the input terminal T3 by way of the input resistance R6. Its collector is connected to the potential V1 and its emitter is connected to the potential V2 by way of resistance R7. The emitter of transistor Q4 is also resistance-capacitance coupled to the base of transistor Q5 by resistance R8 and capacitance C2. The base electrode of transistor Q5 is connected by way of resistance R9 to the potential V5 and its emitter is connected through diodes CR10 to ground and its collector is connected to potential V6 by way of resistance R10. The collector of transistor Q5 is also connected to potential V1 by way of diode CR11. Capacitance coupling by capacitor C3 is employed between the collector of transistor Q5 and base electrode of transistor Q6. The base of transistor Q6 is connected on the one hand to potential V6 by way of resistance R11 and on the other hand to the potential V1 by way of diode CR12. The emitter of transistor Q6 is connected to the potential V1 by way of resistance R12 and the collector is connected to the output terminal T4. Assuming that the input terminal T3 is normally at ground potential, transistors Q5 and Q6 are usually cut off. A negative voltage pulse, say ten volts, turns transistor Q5 on and its collector rises to ground potential, thus turning on transistor Q6. The output current at terminal T4 is determined by resistance R12.

Figure 4:
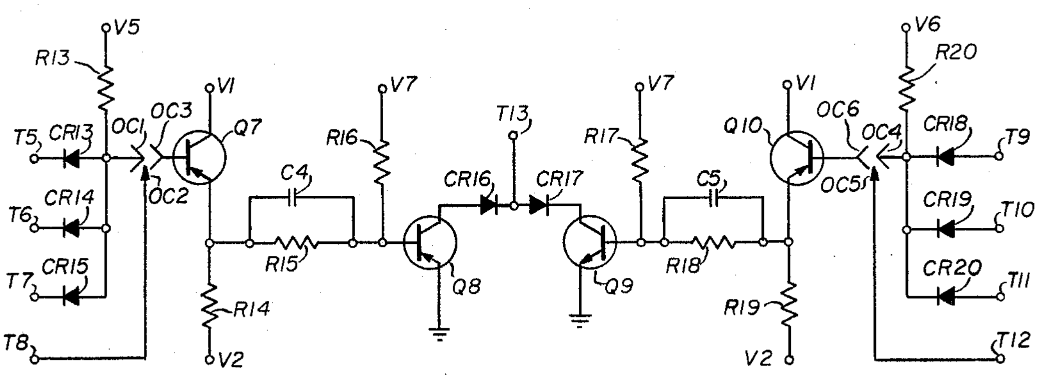
FIG. 4 is a circuit diagram of switching apparatus employed either as a selector switch or a by-pass switch.

Referring to FIG. 4, the basic switch circuit is shown that is employed as both the selector switch and the by-pass switch. The difference between the selector switch and the by-pass switch is that the by-pass switch employs the OR-gate circuits including inputs T5, T6, T7, T9, T10 and T11 and diodes CR13, CR14, CR15, CR18, CR19 and CR20, while the selector switch circuit employs the input terminals T8 and T12. The optional connections OC–1—OC–6 are used according to the switch application; when used as a by-pass switch some of these terminals could be connected to other parts of the memory system (not shown). In either configuration, the input terminals are coupled to the base of transistor Q7 and to the base of transistor Q10. The collector of transistor Q7 is connected directly to potential V1 and its emitter is connected to potential V2 by way of resistance R14. This emitter-follower configurations is resistance-capacitance coupled to the base electrode of transistor Q8 by resistance R15 and capacitance C4. The base of transistor Q8 is also connected to the potential V7 by way of resistance R16. Its emitter is connected directly to ground potential and its collector is connected to the output terminal T13 by way of diodes CR16. A similar configuration is seen for the remainder of the circuit including transistors Q9 and Q10; however, diodes CR17 and transistor Q9 are of reverse polarity to diodes CR16 and transistor Q8. When this circuit configuration is used as a by-pass switch, opposite polarity inputs at the OR-gates will cause transistor Q8, or transistor Q9 as the case may be, to saturate and furnish what is substantially ground potential to terminal T13.

Figure 1:
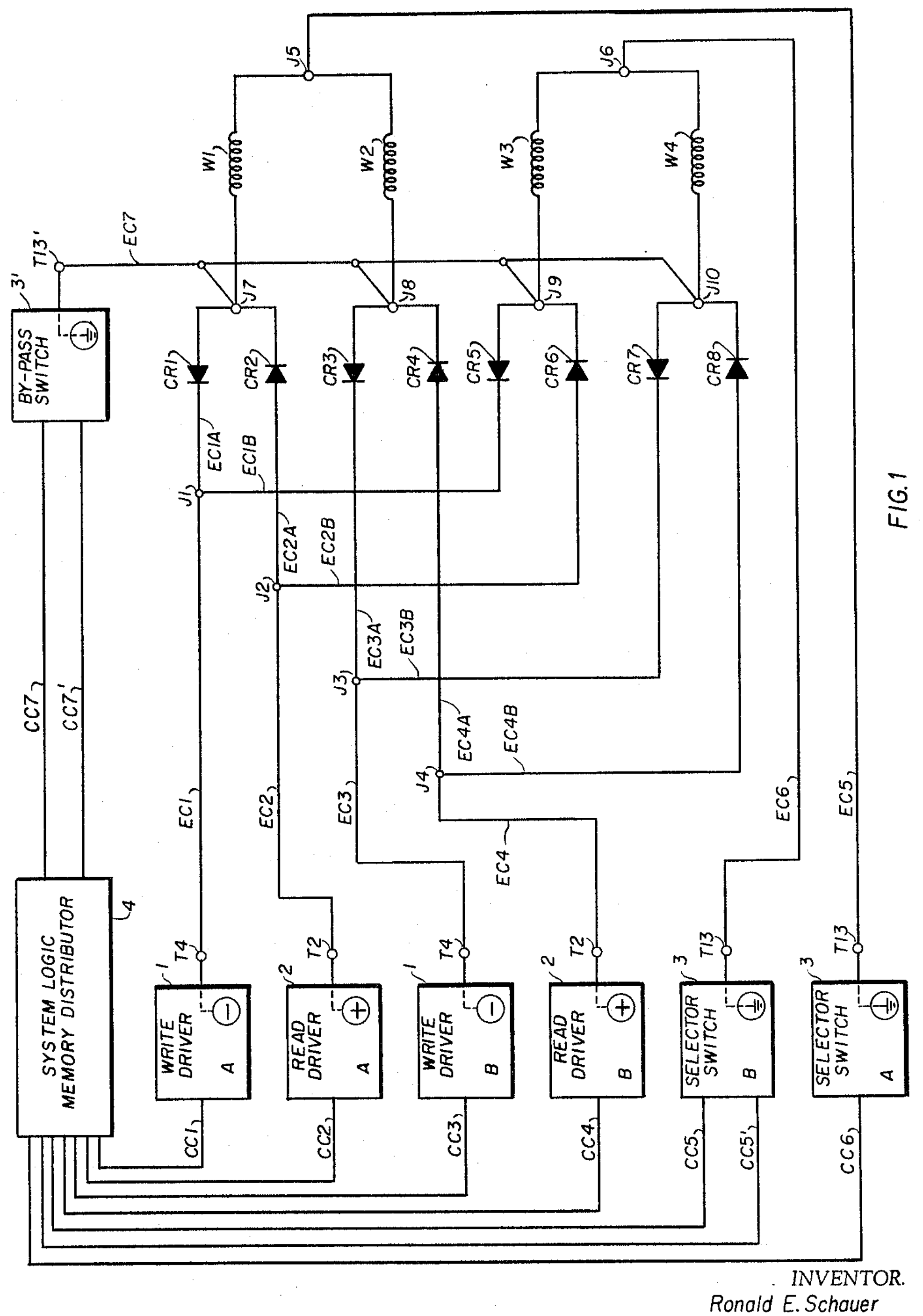
FIG. 1 is an embodiment of the invention showing a selecting apparatus for a four solenoid array.

Referring now to FIG. 1, a driving system is shown for a four solenoid array. It should be noted that this is for illustration only and such a system may be increased according to the number of drivers used and the electrical capabilities of the drivers. Particularly shown are solenoids W1–W4, the drivers including write drive A, write drive B referenced with the numeral 1 and read driver A, read driver B referenced with the numeral 2, the selector switch B and selector switch A referenced 3, the by-pass switch referenced 3′, and the system logic memory distributor 4. The diodes CR1–CR8 are interposed between the various current drivers and the solenoids as will be explained below. The various control connections CC1–CC7′, the electrical connections EC1–EC7, and the junctions J1–J10 are referenced for a clearer explanation as will be given below.

For illustration, assume that in FIGURES 2–7 the following potentials are supplied.

| | Volts |
|---|---|
| V1 | −10 |
| V2 | +5 |
| V3 | +30 |
| V4 | +15 |
| V5 | +20 |
| V6 | −20 |
| V7 | +10 |

Figure 5:
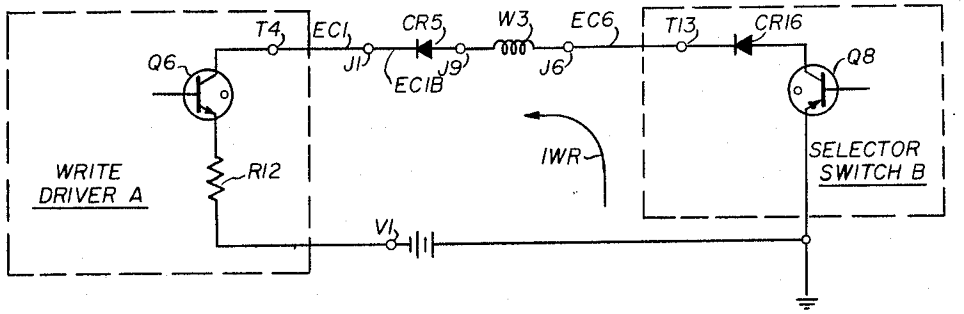
FIG. 5 is a partial circuit diagram of a WRITE driver and a selector switch showing the WRITE function.

Referring now to FIG. 5 in conjunction with FIG. 1, assume that a WRITE current IWR is to flow through winding W3. The system logic memory distributor 4, by placing a negative pulse on control connection CC1, causes Q6 of write driver A to saturate. Simultaneously, selector switch B is pulsed by way of control connection CC5 and transistor Q8 saturates. A series circuit is thus established and the WRITE current IWR may flow from ground through the emitter-collector path of transistor Q8, diode CR16, terminal T13, electrical connection EC6, junction J6, through winding W3, juction J9, diode CR5, electrical connection EC1B, junction J1, electrical connection EC1, terminal T4, through the collector-emitter path of transistor Q6, resistance R12, through the battery representing potential V1, and back to ground potential. Assuming that other apparatus in the system have functioned properly and established their particular magnetic field contributions to the memory associated with the solenoid, a word has been written into the memory.

Figure 6:
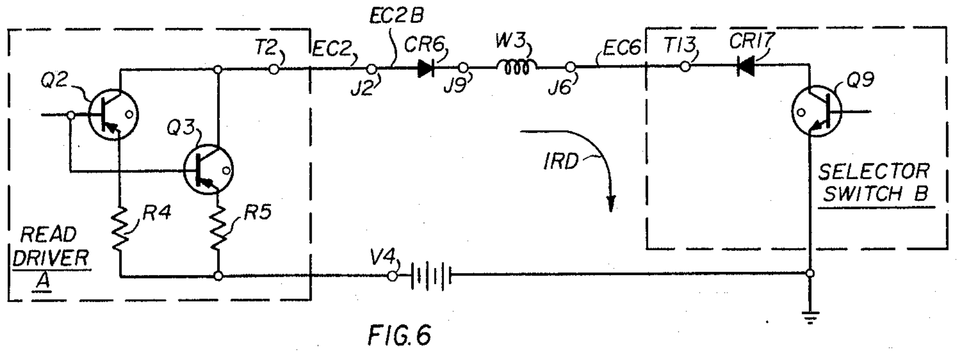
FIG. 6 is a partial circuit diagram of a READ driver and a selector switch showing the READ function.

Referring to FIG. 6 in conjunction with FIG. 1, assume now that a READ current IRD is to flow through the solenoid winding W3. Simultaneously, the system logic memory distributor, by way of control connections CC2 and CC5′, pulses read driver A and selector switch B causing transistors Q2, Q3 and transistor Q9, respectively, to saturate. A series circuit is thus established and the READ current IRD may now flow from the battery representing potential V4 through the parallel resistance-transistor combination R4, R5, Q2, Q3, terminal T2, electrical connection EC2, junction J2, electrical connection EC2B, diode CR6, junction J9, through the solenoid winding W3, junction J6, electrical connection EC6, terminal T13, diode CR17, the collector-emitter path of transistor Q9, to ground potential, and back to potential V4. The solenoid has now been pulsed with the READ current IRD.

Figure 7:
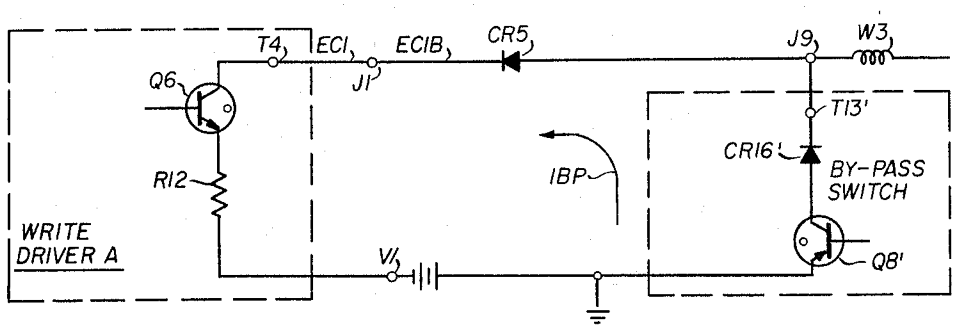
FIG. 7 is a partial circuit diagram of a WRITE driver and a by-pass switch showing how a solenoid is by-passed.

Referring now to FIG. 7 in conjunction with FIG. 1, assume for some reason that the system logic memory distributor acts to enable one of the drivers, say WRITE driver A, at a time when there is supposedly no WRITE function to be performed. In this instance, the by-pass switch is also pulsed by way of control connections CC7 or CC7′ as the case may be to saturate the transistor Q8′. The prime references have been given denoting the similarity between the by-pass switch and the selector switch. Again transistor Q6 is saturated. However, the series circuit that is formed will not allow current to flow through the solenoid winding W3. The by-pass current IBP may however flow from ground through the emitter-collector path of transistor Q8′, diode CR16′, terminal T13′, to junction J9. At this point, current cannot flow through winding W3, or through winding W1 since selector switches A, B are "open." Continuing, the current flows through diode CR5, electrical connection EC1B, junction J1, electrical connection EC1, terminal T4, the collector-emitter path of transistor Q6, resistance R12, through the battery indicating potential B1 and back to ground. A similar situation exists when a READ driver is pulsed and the by-pass switch is pulsed with the exception that the current will flow in an opposite direction and through CR17′ (not shown) and transistor Q9′ (not shown) of the by-pass switch.

While the invention has been described in a specific illustrated embodiment, many changes and modifications may be made by one skilled in the art without departing from the spirit and scope of the invention and should be included in the appended claim.

What is claimed is:

An arrangement for addressing and interrogating the memory of a magnetic memory system, in combination comprising: logic control means; a plurality of two terminal solenoids, one of said two terminals of each said solenoid being connected to one terminal of another solenoid to form solenoid pairs; a plurality of diode pairs, each diode pair being connected to separate ones of the other of said two terminals of each said solenoid, the individual diodes of each diode pair being oppositely poled with respect to said other terminal; a plurality of first current generators, each said generator having an output current of one sense and each said generator being connected to one solenoid of each said solenoid pair by way of the diode of that solenoid having its low impedance direction corresponding to said one sense; a plurality of second current generators each having an output current in a sense opposite to that of said first generators, each said second generator being connected to one solenoid of each said solenoid pair by way of the diode of that solenoid having its low impedance direction corresponding to said opposite current sense; a plurality of switch means each including two transistors each having a base, a collector and an emitter, said collectors being connected to the junction of said one terminal of separate ones of said solenoid pairs, the normal collector-emitter current direction of said two transistors being of opposite sense, said switch means and said first and second solenoid generators being connected to and operable responsive to said logic control means to selectively energize said solenoids by a current of either of said current senses; and other switch means each including two transistors each having a base coupled to said logic control means, a collector and an emitter, said collectors being connected to each of said other terminals of said solenoids, the normal collector-emitter current direction of said two transistors being of opposite sense, said other switch means being operable responsive to said logic control means to divert the output of said first and second current generators to by-pass said solenoids and prevent said solenoids from being energized.

References Cited by the Examiner

UNITED STATES PATENTS

| | | | |
|---|---|---|---|
| 2,993,198 | 7/1961 | Barnes et al. | 340—166 X |
| 3,094,687 | 6/1963 | Archer. | |
| 3,161,861 | 12/1964 | Olsen et al. | 340—166 X |
| 3,192,510 | 6/1965 | Flaherty | 340—174 |

NEIL C. READ, *Primary Examiner.*

THOMAS B. HABECKER, *Examiner.*

D. YUSKO, *Assistant Examiner.*